INVENTORS
R. J. COLLINS
J. A. GIORDMAINE
BY *Ralph M. Braunstein*
ATTORNEY

United States Patent Office

3,316,501
Patented Apr. 25, 1967

---

3,316,501
OPTICAL MASER APPARATUS
Robert J. Collins, Washington, D.C., and Joseph A. Giordmaine, Millington, N.J., assignors to Bell Telephone Laboratories, Incorporated, New York, N.Y., a corporation of New York
Filed Feb. 1, 1963, Ser. No. 256,213
6 Claims. (Cl. 331—94.5)

This invention relates to optical masers. More particularly, it relates to optical masers employing multimode optical structures adapted to produce a plurality of discrete output beams in selected directions.

The development of the optical maser as a coherent light source has made accessible for communications and other purposes the optical portion of the electromagnetic spectrum, which is deemed to extend from the farthest infrared through the ultraviolet. Typical optical masers employ an active medium disposed in an elongated cavity resonator formed by a pair of spaced parallel reflective plates as taught in United States Patent 2,929,922 to A. L. Schawlow and C. H. Townes, or by a pair of axially spaced concave spherical reflectors as shown in United States Patent 3,055,257 to G. D. Boyd, A. G. Fox and T. Li. It is characteristic of such resonators that they are capable of oscillation in a plurality of modes formed by electromagnetic waves propagating parallel to the axis of the cavity. The oscillation frequencies of the various axial modes differ slightly from one another, but all lie within the width of the emission line corresponding to the maser energy level transition of the active medium. In addition to the strictly axial modes, oscillation may also occur in a few nearly-axial modes in which the light waves are bounced back and forth through the active medium many times before they "walk off" the end reflectors. Hitherto optical maser oscillation has, insofar as possible, been limited to axial modes. This has been accomplished, for example, by utilizing reflectors which are small relative to the separation between them, by utilizing cavities with nonreflective side walls, and by providing apertured members which pass axial—but absorb off-axial—light rays.

We have discovered a plurality of new useful optical maser modes which exist in optical structures having reflective side walls as well as reflective end surfaces. Coherent light is emitted from such modes in discrete beams at particular angles to the axes of the structure. Furthermore, we have discovered that specific modes or groups of modes may be selected by providing nonuniform reflectivity patterns on one or more surfaces of an optical structure of the invention. For each such pattern there is a corresponding unique set of output beam directions.

It is characteristic of one embodiment of the invention that oscillation in any mode or group of modes commences when the reflectivity of the cavity walls becomes sufficiently nonuniform. At a particular point the cavity abruptly ceases to oscillate in the priorly prevailing mode and oscillates in the selected modes. In another embodiment the reflectivity pattern remains constant while the pump power applied to the active medium is varied. In each case the set of output beam directions undergoes a corresponding abrupt change at a particular point so that the individual beams are, in effect, deflected from a first to a second set of angular positions without sweeping through the intermediate positions. Thus the device may function as a multiposition high speed optical switch suitable, for example, for use in digital electronic systems. Equivalent effects can be produced by varying the volume distribution of atoms or molecules in the various energy states, or by varying the spatial distribution of losses in the optical structure.

Among the applications of the invention is a switching system in which energization of particular circuits is made to correspond to particular modes or groups of modes in the optical structure disclosed herein. Circuits are selected by establishing predetermined patterns of reflectivity on the surfaces of the cavity or by equivalent measures. The corresponding set of output beams is then directed to an array of detectors which responds to specific patterns and causes the indicated connections to be made.

In another switching arrangement utilizing the invention each output beam of a particular mode governs an independent circuit. Thus the switch controls a plurality of sets of circuits, the several circuits of each set being available simultaneously for the performance of the desired functions.

It is an inherent property of an optical maser switch in accordance with the invention that each of the discrete outputs is a coherent light beam. Hence, each beam is modulatable and, because of the very high frequencies of optical waves, capable of transmitting enormous quantities of information. In some communications applications of the invention, therefore, it will be advantageous to utilize the individual output beams as part of a transmission path. Each beam may be modulated independently, or they may be modulated according to a predetermined pattern or code which is decipherable at a receiving station.

In addition to the applications of the invention in its embodiment as a switchable oscillator, many uses exist for a coherent light amplifier with similar characteristics. As an amplifier, the optical maser of the invention is capable of amplifying—simultaneously or sequentially—a plurality of light beams incident at various discrete angles on a transparent input wall of the cavity. An amplified light beam may be caused to emerge from the device at the same place and angle as that at which it entered, or at a different position and angle. If a number of beams are simultaneously incident at the input at discrete angles and positions, the invention may be switched to amplify first one and the other. Thus, by controlling the reflectivity patterns on the various surfaces of the optical structure, the invention may be used to scan or sample an array of inputs. Equivalent effects may be produced by varying the volume distribution of gain or loss within the optical structure.

In a preferred illustrative embodiment the invention comprises an optical structure containing an active optical maser medium. The structure has reflective side walls and end surfaces and is adapted to reflect a plurality of light beams over discrete paths through the active medium. Means are provided for pumping the medium to establish therein the negative temperature state necessary for optical maser action. Means responsive to input control signals are also provided for varying the effective reflectivity of selected areas of the optical surfaces to establish predetermined reflectivity patterns, thereby selecting particular mode or groups of modes for light waves propagating in the cavity.

The objects and features of the invention will be fully understood from the following more detailed discussion taken in conjunction with the accompanying drawing in which.

Throughout the drawing similar parts are designated by the same reference numeral. In some of the figures depicting optical masers, pumping apparatus associated therewith has been omitted in the interest of clarity.

I

Figure 1:
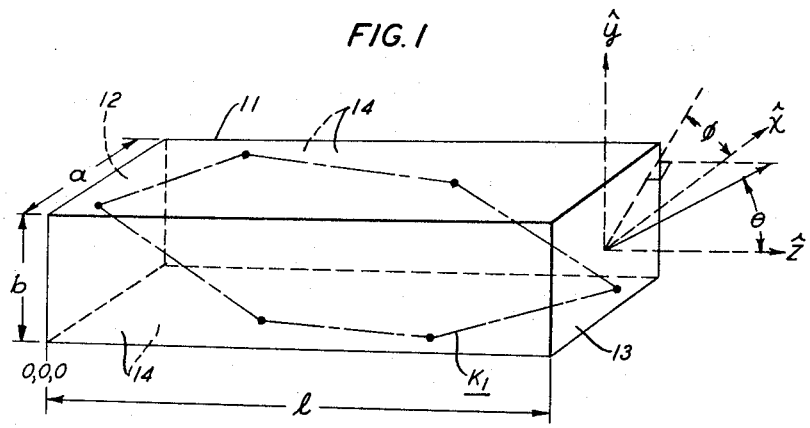
FIG. 1 is a diagram of an optical structure which is helpful in understanding the invention.

The principles of the invention represented by the illustrative embodiments may be better understood by considering an optical maser having a cylindrical cavity resonator of rectangular cross section, as depicted in FIG. 1.

All surfaces of the resonator 11 are optically flat and polished. Portions of at least one pair of surfaces, such as the surfaces 12 and 13, are highly reflective. Although it is to be understood that portions of additional surfaces, up to and including all surfaces of the resonator, may also be made highly reflective, it will be assumed for purposes of the illustrative analysis that the surface 13 is uniformly partially reflective and partially transmissive while various reflectivity patterns are imposed on the surface 12. Furthermore, in the case of a solid medium such as ruby where the medium itself forms the cavity, the side walls 14 of the cavity 11, being optically polished, are highly reflective for light rays internally incident at angles greater than the critical angle for total internal reflection, defined as $\theta_0 = \sin^{-1} (1/n)$ where $n$ is the refractive index.

An electromagnetic mode in the cavity 11 may be considered as a distribution of standing plane waves each of which has a propagation vector at an angle $\theta < \theta_0$ to the cavity axis. $\theta$ here represents an internal angle. The direction of light rays emitted through the surface 13 will be different due to refraction. The external and internal angles are related by $\sin \theta' = n \sin \theta$. All modes with $\theta < \theta_0$ have relative high Q; the Q varies slowly as a function of $\theta$ and has a broad minimum at $\theta = 0$. When all surfaces of the cavity are uniformly reflective there is no effective mechanism of Q selection among the modes at angles between 0 and $\theta_0$. Thus, when the active medium is pumped to produce stimulated optical emission, radiation tends to build up uniformly in all modes in this range.

In accordance with our invention, however, the optical maser cavity 11 may be made to oscillate selectively in the axial direction ($\theta = 0$) and also in a plurality of discrete off-axis directions. Mode selection may be accomplished in the illustrative embodiments by producing suitable nonuniformities of the reflectivity of the end surface 12. Wave energy from the selected modes is abstracted through the partially transmissive end surface 13.

From geometrical optical considerations it can be shown that there are in the cavity 11 a set of unique ray directions K which are characterized in that a ray launched from any point along K returns, after a small number of specular reflections at the cavity walls, to its starting point. One such path is indicated by $K_1$ in FIG. 1. A mechanical analog is the trajectory of a small ball bouncing elastically on the smooth interior surfaces of a rectangular box in the absence of gravity. If the ball is thrown along a direction K its path is re-entrant after a small number of bounces. As it appears that the optical modes of the invention correspond to geometrical light rays traveling in K directions, they may be referred to as "bouncing ball" modes. A second set of unique ray directions K' are also of interest. These have the property that a ray launched from a point on a surface of the cavity returns to a new point after each trip around the box; however, a line connecting consecutive points of incidence describes a closed curve. It follows from the geometrical optical interpretation of the local directional modes of the invention that the optical structure advantageously comprises reflective surfaces in at least three discrete planes which preferably are nonparallel. Curved reflectors may also be employed. In some cases these may be considered as comprising a plurality of infinitesimal plane surfaces. It will be appreciated that, while reflectors in a minimum of three planes are required to direct a beam over a closed path of the type preferred, most often a larger number will be advantageous. The rectangular structure of the illustrative embodiment, for example, comprises reflectors in six planes.

Mode selection is accomplished in one embodiment of our invention by introducing reflection losses at selected regions of one or more surfaces of the optical cavity. For example, a particular bouncing ball mode may be suppressed by making one surface of the cavity nonreflective at a point where the light rays of the mode are incident. Conversely, the same mode may be isolated by making cavity surfaces nonreflective at all points other than those where light rays of the mode are incident. Similar remarks apply to the K' type of modes, which may be isolated or suppressed by providing reflective or lossy areas, respectively, along the lines formed by the points of ray incidence. In general, it can be said that minimum (or maximum) losses are undergone by rays which are reflected at only a few surface points of the highest (or lowest) reflectivity. Such rays are those propagating along the K directions. Rays which propagate along the K' directions may have intermediate losses, depending on the reflectivity of the surface portions traversed by the points of incidence. Rays belonging to neither class will eventually undergo reflection arbitrarily close to any selected point on a surface. The losses for such rays, therefore, are proportional to the average reflectivity of the cavity surface.

The natural frequencies for the cavity illustrated in FIG. 1 may be obtained by representing the solutions of Maxwell's equations as superpositions of traveling waves having TM or TE character. For a lossless dielectric medium and lossless reflectors the frequencies $\omega_{mn\nu}$ are given by $$\frac{\omega^2 mn\nu \epsilon r}{c^2} = \left(\frac{m\pi}{a}\right)^2 + \left(\frac{n\pi}{b}\right)^2 + \left(\frac{\nu\pi}{l}\right)^2 \quad (1)$$

where $m$, $n$ and $\nu$ are integers, $\epsilon_r$ is the real part of the dielectric constant and $c$ is the velocity of light in vacuo. The E and H field components have time and spatial dependence of the form $$\frac{\sin}{\cos}\left(\frac{m\pi x}{a}\right) \frac{\sin}{\cos}\left(\frac{n\pi y}{b}\right) \frac{\sin}{\cos}\left(\frac{\nu\pi z}{l}\right) \exp(i\omega_{mn\nu}t) \quad (2)$$

The fields of the mode designated $mn\nu$ can be expressed in general as the superposition of plane waves having propagation vectors $$k_{mn\nu} = \left(\pm\frac{m\pi}{a}, \pm\frac{n\pi}{b}, \pm\frac{\nu\pi}{l}\right)$$

The directions of the vectors $k_{mn\nu}$ are specified by the angles $\theta$ and $\varphi$ as shown in FIG. 1 and given by $$\cos \theta_{mn\nu} = \pm\left(\frac{\nu\pi}{l}\right) \bigg/ \frac{\omega_{mn\nu}\epsilon_r^{1/2}}{c} \quad (3a)$$

$$\cos \varphi_{mn\nu} = \pm\left(\frac{n\pi}{b}\right) \bigg/ \left[\left(\frac{m\pi}{a}\right)^2 + \left(\frac{n\pi}{b}\right)^2\right]^{1/2} \quad (3b)$$

In the general case of nonuniformly reflective cavity surfaces, oscillation is possible when $\epsilon_j$, the imaginary part of the dielectric constant, is positive and sufficiently large to compensate for reflection losses. A mode of oscillation for the general case will be considered as a solution of Maxwell's equations which has a real eigenfrequency $\omega$. In general, a mode can be represented as a superposition of the modes $mn\nu$ defined for a lossless cavity. For purposes of illustration, only superposition of two or three modes need be considered. The isolation of a small number of interacting modes of the lossless cavity is justified when they are distinguished by a high degree of degeneracy or especially strong interaction. Let the modes be indicated by $m_1$, $n_1$, $\nu_1$ and $m_2$, $n_2$, $\nu_2$.

The reflectivities of the end surfaces 12 and 13 in FIG. 1 may be represented by equivalent resistivities $R_0(x, y)$ and $R_1(x, y)$ respectively. The side walls are assumed to be lossless. The function $R_0(x, y)$ can be expanded as a Fourier series of the form $$R_0(x, y) = R\left[1 + \sum_{MN} r_{MN} \cos\left(\frac{M\pi x}{a} + \alpha_M\right) \cos\left(\frac{N\pi y}{b} + \beta_N\right)\right] \quad (4)$$

where $M, N = 0, 1, 2, 3 \ldots |r_{MN}| \leq 1$, $R \geq 0$. R represents the average surface resistivity at $z=0$, while $\alpha_M$ and $\beta_N$ are phase constants. Without significant loss of generality for purposes of this example, the surface resistivity at $z=l$ may be taken as uniform and equal to R. The interaction of two modes may now be calculated by imposing the boundary conditions which represent the properties of the cavity surfaces and superposing the field components of the resulting TE and TM waves.

As calculation of the TE and TM modes is similar in this instance, it is sufficient to consider only the TM modes. Let $p_1$ and $q_1$ be the amplitudes of the $TM_{m_1n_1}$ waves propagating in the $+z$ and $-z$ directions respectively. It is also convenient to introduce the notation $$k_1^2 = \left(\frac{m_1\pi}{a}\right)^2 + \left(\frac{n_1\pi}{b}\right)^2 \quad (5a)$$

$$\beta_1^2 = \frac{\omega^2}{c^2}\epsilon - k_1^2 \quad (5b)$$

Similar definitions also apply to the $m_2n_2$ modes.

Substitution of the field components in the equations for the boundary conditions results in a pair of equations from which it can be seen that the only Fourier component MN of $R_0(x, y)$ which plays a role in mixing the two modes is $M = |m_2 - m_1|$, $N = |n_2 - n_1|$. After some manipulation, Equation 6 is obtained:

$$\left[1 - \frac{(1-\rho_1)^2}{(1+\rho_1)^2}\exp(-2i\beta_1 l)\right]\left[1 - \frac{(1-\rho_2)^2}{(1+\rho_2)^2}\exp(-2i\beta_2 l) - \frac{K_{12}K_{21}}{(1+\rho_1)(1+\rho_2)}\left[1 + \frac{(1-\rho_1)}{(1+\rho_1)}\exp(-2i\beta_1 l)\right]\right. \quad (6)$$
$$\left.\left[1 + \frac{(1-\rho_2)}{(1+\rho_2)}\exp(-2i\beta_1 l)\right]\right] = 0$$

in which $\rho_1 = R\omega\epsilon/\beta_1 c$, $\rho_2 = R\omega\epsilon/\beta_2 c$ and $$K_{12} = \frac{\rho_1 k_1^2 n_2}{4k_2^2 n_1} \cdot r_{m_1-m_2, n_1-n_2} \cos \alpha_{m_1-m_2} \cos \beta_{n_1-n_2}$$

$$K_{21} = \frac{\rho_2 k_2^2 n_1}{4k_1^2 n_2} \cdot r_{m_1-m_2, n_1-n_2} \cos \alpha_{m_1-m_2} \cos \beta_{n_1-n_2}$$

For perfectly reflecting walls, $R = \rho_1 = \rho_2 = K_{12} = K_{21} = 0$ and Equation 6 reduces to $$[1 - \exp(-2i\beta_{01}l)][1 - \exp(-2i\beta_{02}l)] = 0 \quad (7)$$

The subscript 0 indicates solutions for the case $R=0$.

The solution of Equation 6 for the case of small average resistivity R is obtained by assuming $\rho \ll 1$ and neglecting terms of higher order than the second in the quantities $\rho_1$, $\rho_2$, $K_{12}$ and $K_{21}$. $\beta_1$ and $\beta_2$ are expanded in a Taylor series about $\beta_{01}$ and $\beta_{02}$ respectively. Only the first term of the expansion need be retained and Equation 8 results:

$$\left[4\rho_1 - 2\beta_{11}l + \frac{2il(\omega - \omega_{01})}{v_{g1}}\right] \cdot \left[4\rho_2 - 2\beta_{12}l + \frac{2il(\omega - \omega_{02})}{v_{g2}}\right] - 4K_{12}K_{21} = 0 \quad (8)$$

The quantities $\beta_{11}$ and $\beta_{12}$ are the imaginary parts of the propagation constants of the $TM_{m_1n_1}$ and $TM_{m_2n_2}$ waves; $v_{g1}$ and $v_{g2}$ are the group velocities.

The quantity $4\rho_1$ can be shown to represent for the $TM_{m_1n_1\nu_1}$ mode the fractional energy loss per reflection at a surface of uniform resistivity equal to the actual average resistivity R. Let $1/Q_{s1}$ be the ratio of this energy loss per reflection to the energy stored in the mode. Calculation shows that $$1/Q_{s1} \cong 4 \; R \; c/\omega_0 l \quad (9a)$$

and $$1/Q_{s2} \cong 4 \; R \; c/\omega_0 l \quad (9b)$$

Similarly, the quantity $-2\beta_{11}l$ represents the fractional energy loss due to dielectric absorption per traversal of the cavity. Let the corresponding Q be designated $Q_m$. In the case of oscillation, $Q_m$ is a negative quantity. By calculation $$\frac{1}{Q_{m1}} = \frac{1}{Q_{m2}} = -\frac{\epsilon_i}{\epsilon_r} \quad (10)$$

The net Q may be defined by $$\frac{1}{Q} = \frac{1}{Q_s} + \frac{1}{Q_m} \quad (11)$$

Equation 6 can now be rewritten $$\left[\frac{1}{Q} + 2i\frac{(\omega-\omega_{01})}{\omega_0}\right]\left[\frac{1}{Q} + 2i\frac{(\omega-\omega_{02})}{\omega_0}\right] - \frac{f_{12}^2}{64Q_s^2} = 0 \quad (12)$$

where $$\omega_0 \equiv \tfrac{1}{2}(\omega_{01} + \omega_{02})$$

and $$f_{12} = r_{m_1-m_2, n_1-n_2} \cos \alpha_{m_1-m_2} \cos \beta_{n_1-n_2}$$

The oscillation frequencies of the cavity are the solutions of Equation 12 for *real* values of $\omega$. Separation of the equation into real and imaginary parts yields the simultaneous equations $$\omega = \omega_0 \pm \frac{1}{2}\left[(\Delta\omega)^2 + \left(\frac{\omega_0}{Q}\right)^2 - \left(\frac{f_{12}\omega_0}{8Q_s}\right)^2\right]^{1/2} \quad (13a)$$

$$\frac{1}{Q}(\omega - \omega_0) = 0 \quad (13b)$$

where $\Delta\omega \equiv \omega_{01} - \omega_{02}$.

Solution of Equations 13 reveals two qualitatively different regions of oscillation determined by the relative magnitudes of $\Delta\omega$ and $f_{12}$, the latter being the normalized Fourier component of the resistivity which is effective in mixing the $m_1n_1\nu_1$ and $m_2n_2\nu_2$ modes:

I.
$$\left.\begin{array}{l}|\Delta\omega| \geq \left|\dfrac{f_{12}\omega_0}{8Q_s}\right| \\ \omega = \omega_0 \pm \dfrac{1}{2}\left[(\Delta\omega)^2 - \left(\dfrac{f_{12}\omega_0}{8Q_s}\right)^2\right]^{1/2} \\ \dfrac{1}{Q} = 0\end{array}\right\} \quad (14)$$

II.
$$\left.\begin{array}{l}|\Delta\omega| \leq \left|\dfrac{f_{12}\omega_0}{8Q_s}\right| \\ \omega = \omega_0 \\ \dfrac{1}{Q} = \left[\left(\dfrac{f_{12}}{8Q_s}\right)^2 - \left(\dfrac{\Delta\omega}{\omega_0}\right)^2\right]^{1/2}\end{array}\right\} \quad (15)$$

Figure 2A:
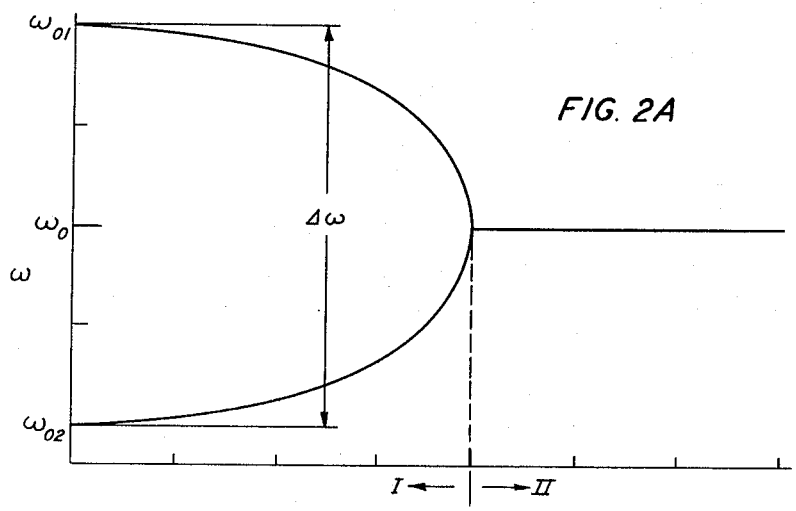
FIGS. 2A and 2B are curves illustrating some important characteristics of an optical cavity resonator of the invention.
Figure 2B:
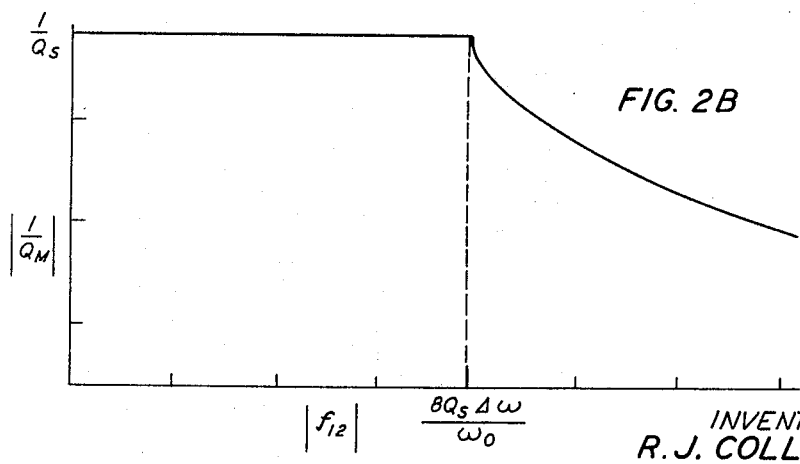

Equations 14 and 15 show that as the surface resistivity is made increasingly nonuniform with the average resistivity R held fixed, i.e., as $|f_{12}|$ increases from zero, the oscillation frequencies are increasingly pulled from the unperturbed frequencies $\omega_{01}$ and $\omega_{02}$ toward the center frequency $\omega_0$. This is illustrated in FIG. 2A. In region I the threshold condition for each mode remains unchanged, i.e., $1/Q = 0$ and $|1/Q_m| = 1/Q_s$. As $|f_{12}|$ approaches the critical value $|8Q_s\Delta\omega/\omega_0|$ both frequencies approach $\omega_0$. As $|f_{12}|$ increases beyond the critical value the oscillation frequency remains fixed at $\omega_0$ and the threshold value of $|1/Q_m|$ decreases as shown in Equation 16 and in FIG. 2B.

$$\left|\frac{1}{Q_m}\right| = \frac{1}{Q_s} - \left[\left(\frac{f_{12}}{8Q_s}\right)^2 - \left(\frac{\Delta\omega}{\omega_0}\right)^2\right]^{1/2} \quad (16)$$

Conversely, for given nonuniform boundary losses the oscillation threshold is reduced when the two unperturbed modes are made sufficiently degenerate, i.e., as $|\Delta\omega|$ is decreased below the critical value.

The significance of this conclusion can be grasped by considering a cavity formed by uniformly reflective surfaces and capable of supporting a large number of normal modes of similar $Q_s$ and $Q_m$ distributed over a frequency interval $\Delta\nu$. As the value of $\epsilon_i$ within $\Delta\nu$ is made increasingly positive, as by pumping an active medium therein to produce a population inversion, the oscillation threshold value of $1/Q_m$ for all the modes will be approached uniformly. If now the boundary conditions are perturbed so as to mix the original modes—for example, by varying the reflectivity of one or more of the cavity surfaces—oscillation tends to occur selectively in the most highly degenerate coupled pairs of original modes. This mechanism of mode selection is highly discriminating. The Q's of the various modes are relatively high so that a large on-off ratio results. This is, the light emitted from a particular mode is very bright when the mode is selected and is negligible at other times.

A physical interpretation of the decrease in the oscillation threshold of the selected modes may be based on a comparison of the spatial energy distribution associated with the solutions for regions I and II set forth above. The following results are obtained:

I. $\quad |\Delta\omega| \geq \left|\frac{f_{12}\omega_0}{8Q_s}\right|$ $p_1 = q_1$
$p_2 = q_2$ $$\frac{p_1}{p_2} = \frac{-i\frac{k_1^2 n_2 f \omega_0}{k_2^2 n_1 8Q_s}}{\Delta\omega \mp F\left[(\Delta\omega)^2 - \left(\frac{f\omega_0}{8Q_s}\right)^2\right]^{1/2}} \quad (17)$$

II. $\quad |\Delta\omega| \leq \left|\frac{f_{12}\omega_0}{8Q_s}\right|$ $p_1 = q_1$
$p_2 = q_2$ $$\frac{p_1}{p_2} = -\frac{k_1^2 n_2}{k_2^2 n_1} e^{i\Psi} \quad (18)$$

where $$\left(\sin\Psi = \frac{\Delta\omega}{\omega_0} \bigg/ \frac{f}{8Q_s}\right)$$

The significant feature of Equation 17 is that $p_1$ and $p_2$ as well as $q_1$ and $q_2$ are in quadrature. It follows that in region I the field components of the allowed modes of oscillation contain contributions from $TM_{m_1 n_1 \nu_1}$ and $TM_{m_2 n_2 \nu_2}$ in quadrature. Since the time average energy density consists of products of the field components with their complex conjugates, it contains no interference type terms between the field components of these modes. Therefore, the spatial energy distribution in region I is uniform. Although the time average energy density associated with the fields displays nodes and antinodes on the scale of the optical wavelength, it may be considered uniform on a scale much finer than the cavity dimensions. The term *uniform* is used here in this special sense.

In region II on the other hand, the energy distribution does contain interference terms between the mode field components and may be strongly nonuniform. It can be shown that in cases of extreme degeneracy, where $\Delta\omega/\omega_0 \ll f/8Q_s$, the energy density approaches zero in some regions of the cavity and twice the average value in other regions. Thus, as the degeneracy of the unperturbed modes is increased beyond the critical value by changing the reflectivity pattern on the cavity surfaces, the energy distribution becomes increasingly concentrated at the more highly reflective areas, thereby reducing the total losses and consequently the oscillation threshold. It follows that mode selection in the invention may be accomplished by the converse of varying the reflectivity of the cavity surfaces, i.e., by producing a nonuniform spatial distribution of excited particles of the active medium, or by introducing nonuniform spatially distributed losses.

Calculation of the interaction of three modes is algebraically more complicated, but the same general procedure may be followed. For example, for the case of a mode coupled equally to each of two other modes and equally spaced from them in frequency curves of the same type as those shown in FIG. 2 for the two mode case are obtained, except that an additional unperturbed solution occurs at $\omega = \omega_{01}$ for which the oscillation condition $1/Q = 0$ remains unchanged. Comparison of the threshold conditions for the three mode and two mode cases shows that the additional mode results in a further reduction of the oscillation threshold. As in the two mode case, the energy distribution in the cavity becomes increasingly concentrated near the low loss surface areas as $|\Delta\omega|$ decreases.

The quantities $m$, $n$ and $\nu$ can be written in terms of the angles $\theta_{mn\nu}$ and $\varphi_{mn\nu}$ which define the directions of the output beams:

$$\begin{aligned}
\frac{m}{a} &= \left|\sin\varphi \sin\theta \frac{\omega}{\pi c}\sqrt{\epsilon_r}\right| \\
\frac{n}{b} &= \left|\cos\varphi \sin\theta \frac{\omega}{\pi c}\sqrt{\epsilon_r}\right| \quad (19)\\
\frac{\nu}{l} &= \left|\cos\theta \frac{\omega}{\pi c}\sqrt{\epsilon_r}\right|
\end{aligned}$$

It can be shown that to a good approximation $$\tan\theta = \frac{-\frac{\Delta\nu}{l}}{\pm\frac{\Delta m}{a}\cos\varphi \pm \frac{\Delta n}{b}\sin\varphi} \quad (20)$$

Two modes differing by $\Delta m \Delta n \Delta\nu$ are degenerate in the neighborhood of any direction $\theta$, $\varphi$ given by Equation 20. Direction vectors drawn from the origin of coordinates according to Equation 20 in general are elements of four plane surfaces $$\frac{\Delta m}{a}x \pm \frac{\Delta n}{b}y \pm \frac{\Delta\nu}{l}z = 0 \quad (21)$$

Figure 3:
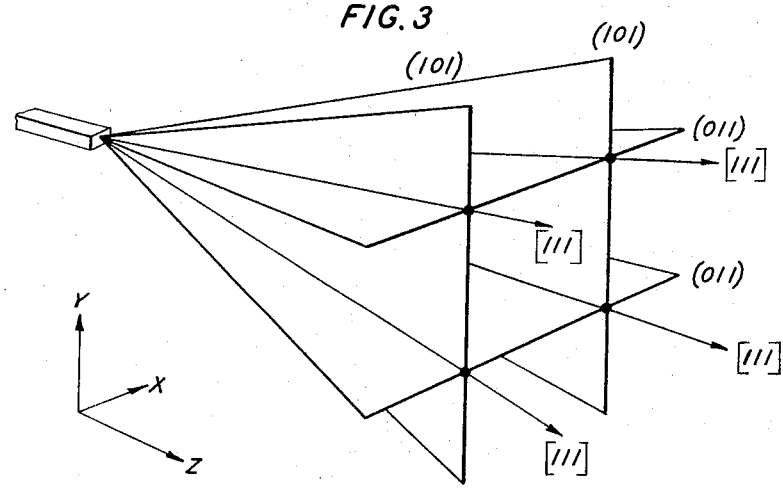
FIG. 3 depicts the directional properties of some optical modes of the invention.

This continuous set of directions may be denoted the $(\Delta m \Delta n \Delta\nu)$ directions. Some of the loci are illustrated in FIG. 3.

Three modes, two pairs of which differ by $\Delta m$, $\Delta n$, $\Delta\nu$ and $\Delta m'$, $\Delta n'$, $\Delta\nu'$ are degenerate in the neighborhood of the directions of the intersections of the loci. These directions are given by $$\left.\begin{aligned}
\tan\theta &= \pm\left(\frac{a^2 N_x^2 + b^2 N_y^2}{l^2 N_z^2}\right)^{1/2} \\
\tan\varphi &= \pm\frac{bN_y}{aN_x}
\end{aligned}\right\} \quad (22)$$

where $N_x$, $N_y$, $N_z$ are integers given by $$\begin{aligned}
N_x &= |\Delta n \Delta\nu' - \delta_1 \Delta\nu \Delta n'| \\
N_y &= |\Delta\nu \Delta m' - \delta_2 \Delta m \Delta\nu'| \quad (23)\\
N_z &= |\Delta m \Delta n' - \delta_1 \delta_2 \Delta n \Delta m'|
\end{aligned}$$

and $\delta_1 = \pm 1$, $\delta_2 = \pm 1$.

The directions for any arbitrary number of modes may be calculated by extending the procedure illustrated herein. A similar analysis may be made of optical structures having arbitrary shapes.

II

Figure 4:
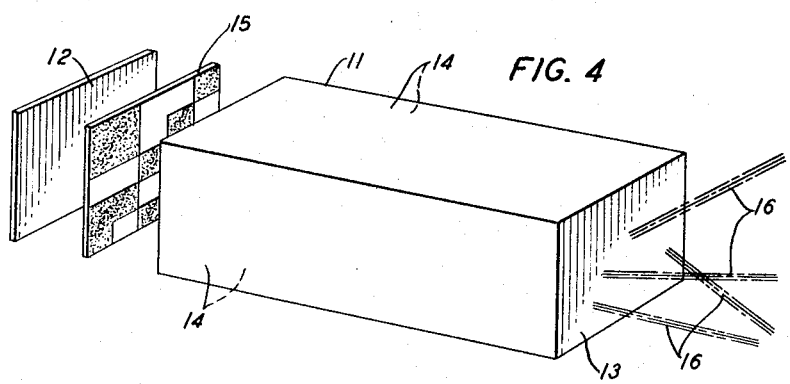
FIG. 4 shows an illustrative embodiment of the invention.

There is depicted in FIG. 4 an illustrative embodiment of the invention comprising an optical cavity structure 11 having reflective side walls 14 and reflective end surfaces 12 and 13. An active optical maser medium is disposed within the structure 11. The surface 13 is partially transmissive to permit the abstraction of light wave energy from selected directional modes within the cavity, the light from the selected modes being emitted in discrete beams 16. Under normal conditions the beams may overlap somewhat in the near-field. If it is desired to resolve them into a spot pattern close to the maser a lens or equivalent optical apparatus may be employed.

In accordance with the principles of the invention, mode selection may be accomplished by varying the effective reflectivity of one or more surfaces of the optical structure 11 or, as explained in Section I, by the equivalent methods of varying the spatial distribution of gain or loss therewithin. In the embodiment shown in FIG. 4, particular directional modes are selected by varying the effective reflectivity of the surface 12. This is accomplished by interposing between the active medium and the surface 12 an array of light controlling elements 15 which is adapted to produce light transmission patterns of the desired form or complexity. The light controlling elements 15 may be of any known type while the construction of a matrix adapted to produce various transmission patterns is within the skill of workers in the art. For example, an array of light values employing Kerr cells or Pockels effect cells may be utilized. If a fixed pattern is desired, a perforated opaque member may be employed. A plurality of light controlling elements may be placed in series with respect to the light rays at various positions in the matrix so that logic functions may be performed.

In a model of the invention, local directional modes were produced using a ruby crystal as the active medium. The crystal was cylindrical and of rectangular cross section. All surfaces were optically polished to form an optical cavity. Reflective coatings were applied to the end surfaces, one of the coatings being partially transmissive to permit emergence of light energy from the cavity. Various nonuniform patterns of effective reflectivity were imposed on the other end surface, and directional light beams were observed in unique patterns corresponding thereto.

Figure 5:
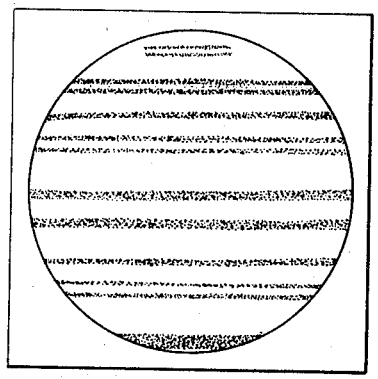
FIGS. 5–12 are representations of patterns produced by focusing the directional output beams corresponding to various reflectivity patterns of an optical structure of the invention.

It was found in general that reducing the reflectivity of about 10 percent or more of the area of the end surface in a regular pattern caused emission whose far field pattern consisted of lines and spots of the type predicted by the analysis of Section I. When the end surface was made nonreflective along two parallel strips at opposite edges, the emission pattern consisted of a series of bright parallel lines running in the same direction as those shown in the drawing in FIG. 5. For clarity these lines have been depicted as black against a white background. This result follows from the fact that the nonuniformity extends in one direction only. Thus, $R_0(x, y) = R_0'(y)$ and the Fourier decomposition of the reflectivity distribution contains only terms with $$M = \Delta m = 0$$

in Equation 4. Since all of the allowed loci ($O\Delta n\Delta \nu$) are parallel, no intersections corresponding to three mode degeneracy are expected. A reduced oscillation threshold was observed.

Figure 6:
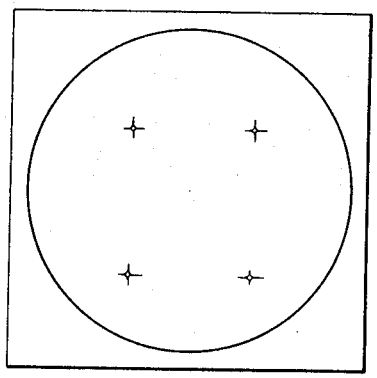
Figure 7A:
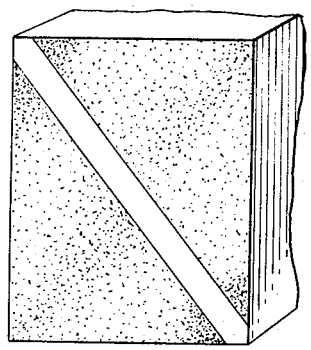
Figure 8A:
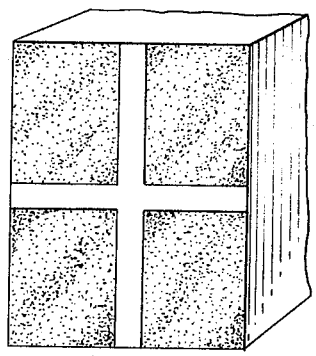
Figure 9A:
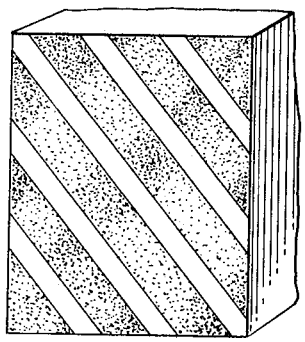
Figure 10A:
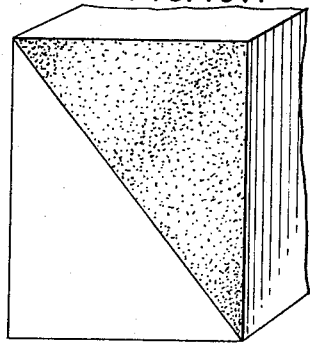
Figure 11A:
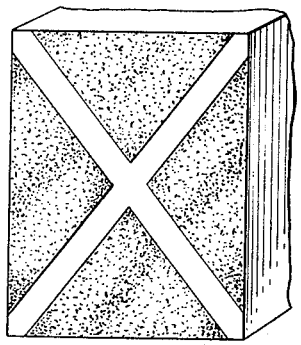
Figure 12A:
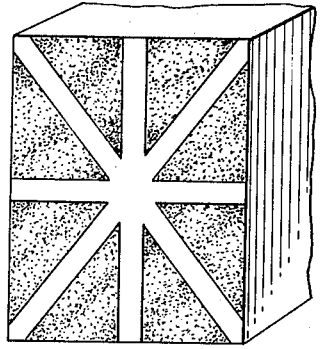
Figure 7B:
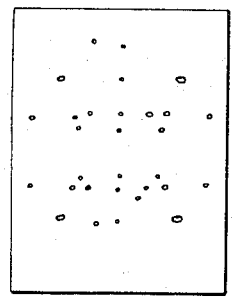
Figure 8B:
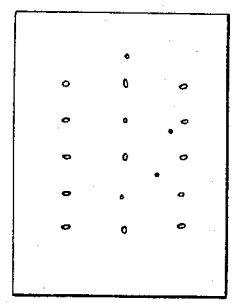
Figure 9B:
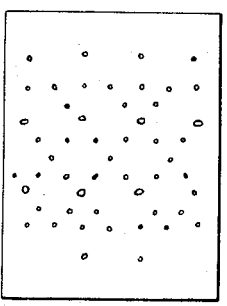
Figure 10B:
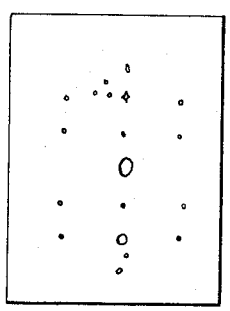
Figure 12B:
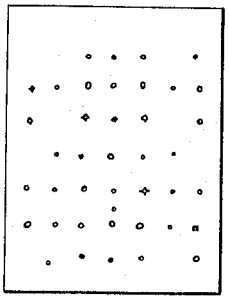
Figure 11B:
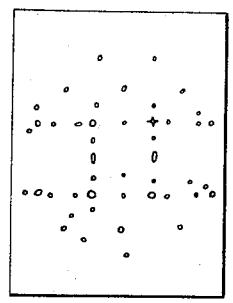

Fourier terms leading to ($\Delta m O \Delta \nu$) loci may be introduced by reducing the reflectivity along a strip perpendicular to the direction of the parallel strips discussed in the preceding paragraph. FIG. 6 is a drawing of the far field emission pattern produced by a reflectivity pattern formed by two non-reflective strips along perpendicular edges of an end surface of the cavity. Intense and highly collimated emission occurs at the intersections of the various loci. These directions correspond to bouncing ball modes, and a further reduction of the oscillation threshold was observed.

FIGS. 7 through 12 are drawings of the far field emission corresponding to the indicated particular reflectivity patterns on the end surface of the cavity. For clarity these patterns are depicted as black against a white background. In actuality they are bright spots against a dark background. It will be appreciated that, although the emission patterns may be calculated in each case, it is less laborious in deriving patterns for specific applications to impose an arbitrary series of reflectivity patterns on the cavity surfaces and then to utilize the unique patterns which result. The patterns illustrated in the drawing are merely indicative of those which may be produced.

Figure 13:
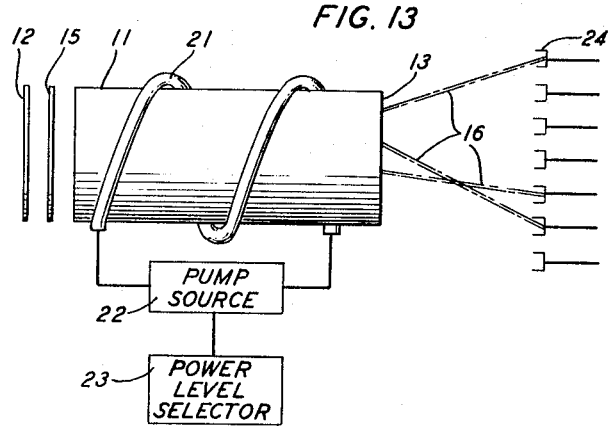
FIG. 13 depicts an illustrative embodiment of the invention.

There is shown in FIG. 13 an optical maser embodying the invention and including a source of illumination for optically pumping the active medium. It is to be understood that other active media may be employed which are advantageously pumped by other means, such as by collisions with energetic atomic or subatomic particles. The lamp 21, which is illustrative of the various possible pumping means, is connected to a source of pump power 22. The source 22 is connected to and under the control of a power level selector 23 adapted to maintain at various predetermined levels the pump power applied to the active medium. An array of detectors is positioned in the path of the output beams 16.

Mode selection in the embodiment shown in FIG. 13 may be accomplished by controlling the intensity of the pump power supplied to the active medium contained within the optical cavity 11. For example, as the pump level is gradually increased from zero, it eventually reaches and exceeds the critical value for oscillation in the bouncing ball mode of lowest threshold. The population of excited atoms in the portion of the cavity excited by that mode remains clamped at a value slightly above the threshold, while further increase of the pump power increases the population of the excited states in other portions of the cavity until the threshold of another mode is reached. In general, there are three possibilities at this point: (a) oscillation is transferred to the new mode while the first mode is quenched; (b) the two modes oscillate simultaneously; or (c) oscillation in the new mode is prevented by oscillation in the first mode. In any specific case, the actual result depends on the details of the overlap of the local regions of the cavity corresponding to the two modes. In practice, the first possibility is the one most frequently observed. This, together with the second possibility, permits the use of this embodiment of the invention as a switch in a manner similar to the embodiments in which other parameters are varied. The third possibility may be considered a variant, in which the threshold of the new mode is increased by some amount dependent on the geometry of the device. Switching times of the order of $10^{-6}$ second and smaller are feasible.

The array of detectors 24 may be arranged so that each detector responds individually to incident light beams and controls a separate work circuit in response thereto. Alternatively, the detectors may be interconnected to be responsive to specific patterns of the output beams so that the various work circuits are each controlled by the combined outputs of a particular set of detectors. A great variety of such arrays are possible and may be assembled by those skilled in the art. Furthermore, a plurality of optical masers of the invention may be arranged with their output beams incident on the same array of detectors.

Although the invention has been described with particular reference to specific embodiments thereof, this is to be construed as illustrative only and not as a limitation. Many modifications and variations of the inven-

What is claimed is:

1. An optical maser device comprising means forming an optical cavity resonator having a plurality of non-parallel interior reflecting surfaces, said resonator being resonant for a plurality of optical modes, light rays in each of said modes being incident at a discrete angle and position on said reflective surfaces for forming discrete far field patterns characteristic of the particular optical modes excited and supported in said cavity resonator, means for abstracting light wave energy from said resonator, an active medium within said resonator, means for pumping said medium to produce a population inversion among the energy levels thereof whereby oscillation occurs in said optical modes, said modes being further characterized by having different thresholds of oscillation, and means for selectively producing different discrete far field patterns in accordance with applied signals comprising means responsive to the applied signals for exceeding the oscillation threshold of selected ones of said modes to produce the discrete far field patterns.

2. An optical maser device as claimed in claim 1 wherein the reflecting surfaces of said resonator comprise a plurality of mutually intersecting planes.

3. An optical maser device as claimed in claim 1 wherein said means for exceeding the oscillation threshold includes means for varying the output of said pumping means.

4. An optical maser switching apparatus comprising means forming a multimode optical cavity resonator having a plurality of non-parallel interior reflecting surfaces, said resonator being resonant for a plurality of optical modes, light rays in each of said modes being incident at a discrete angle and position on said reflective surfaces for forming far field patterns characteristic of optical modes excited and supported in said resonator, at least one of said surfaces having a partially transmissive portion to permit the abstraction of light wave energy from said modes, an active medium within said resonator, means for pumping said medium to produce a population inversion among the energy levels thereof whereby oscillation occurs in said modes, a plurality of detector means arranged in a geometric array external to said resonator in the path of the light wave energy emerging from said resonator for intercepting said far field pattern, and means coupled to said pumping means for varying the far field pattern by selectively energizing discrete ones of said modes in response to applied signals whereby discrete ones of said plurality of detector means are activated in accordance with the energy distribution of the far field pattern.

5. Optical maser switching apparatus as claimed in claim 4 wherein said means for energizing discrete ones of said modes comprises means for varying the output of said pumping means.

6. An optical maser device as claimed in claim 4 wherein the reflecting surfaces of said resonator comprise a plurality of mutually intersecting planes.

References Cited by the Examiner

UNITED STATES PATENTS

| | | | |
|---|---|---|---|
| 3,136,959 | 6/1964 | Culver | 331—94.5 |
| 3,167,741 | 1/1965 | Brown | 88—1 |
| 3,215,949 | 11/1965 | Garrett | 331—94.5 |

JEWELL H. PEDERSEN, *Primary Examiner.*

RONALD L. WIBERT, *Examiner.*